Sept. 29, 1970  OSAMU SAMUTA  3,531,669
DC MOTOR WITH SPEED CONTROL ARRANGEMENT
Filed Sept. 6, 1968
2 Sheets-Sheet 1
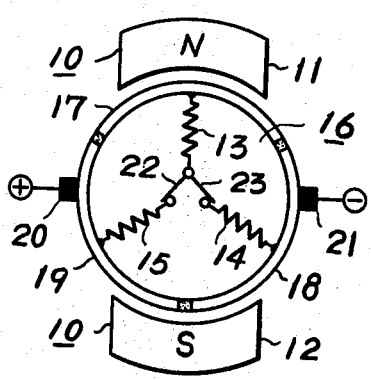
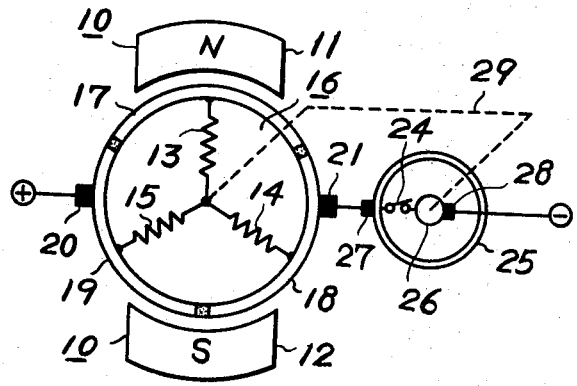
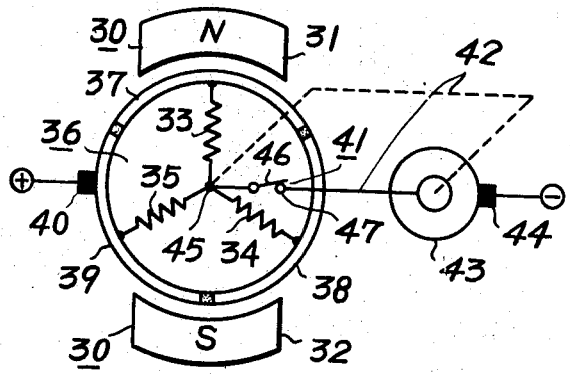
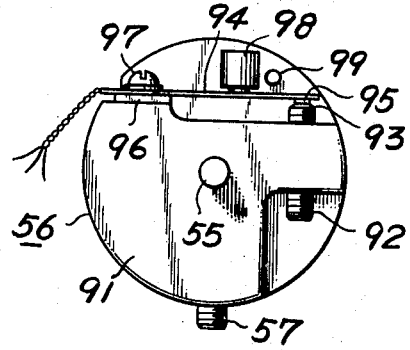
INVENTOR
OSAMU SAMUTA
BY Glascock, Downing + Seebold.
ATTORNEYS Sept. 29, 1970     OSAMU SAMUTA     3,531,669
DC MOTOR WITH SPEED CONTROL ARRANGEMENT
Filed Sept. 6, 1968     2 Sheets-Sheet 2
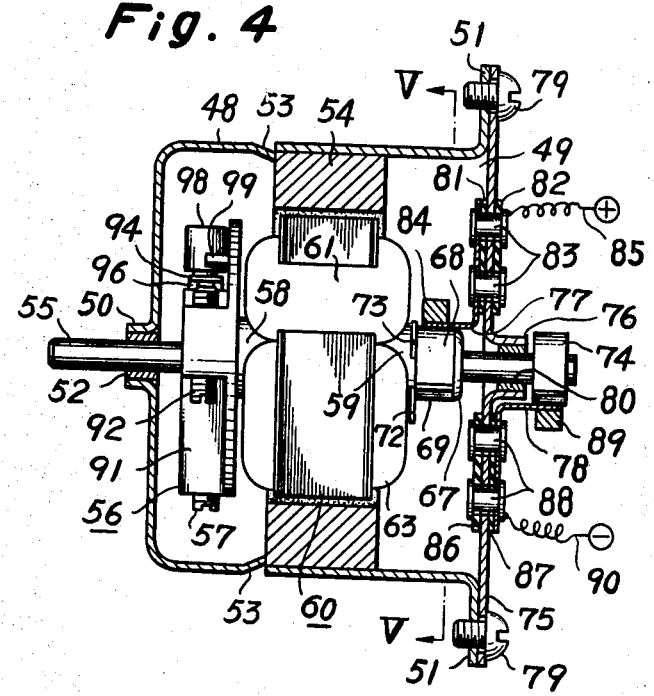
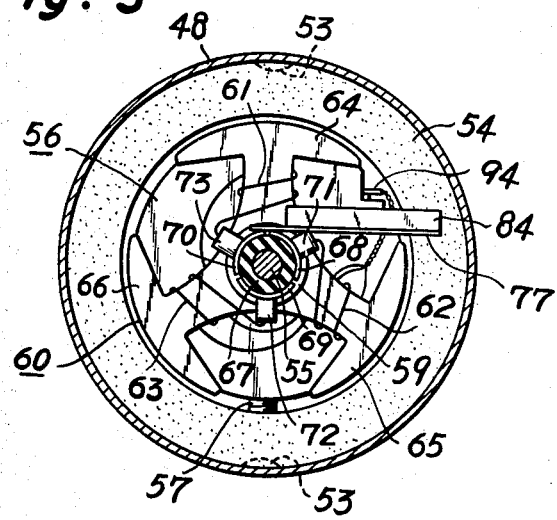
INVENTOR
OSAMU SAMUTA
BY Glascock, Downing & Seebold.
ATTORNEYS

# United States Patent Office 3,531,669
Patented Sept. 29, 1970

3,531,669
DC MOTOR WITH SPEED CONTROL ARRANGEMENT
Osamu Samuta, Yokohama, Japan, assignor to Victor Company of Japan, Limited, Yokohama, Japan
Filed Sept. 6, 1968, Ser. No. 757,988
Claims priority, application Japan, Sept. 9, 1967, 42/57,793
Int. Cl. H02k *11/00*
U.S. Cl. 310—68            7 Claims

ABSTRACT OF THE DISCLOSURE

A DC motor with centrifugal governor comprising a laminatetd iron core having armature coils wound around respective pole pieces of said core, a plurality of commutator segments connected with one end of each armature coil, said armature coils being connected together at the other ends to form a connecting point, a single governor contact point and a slip ring, said connecting point being connected to said slip ring through said governor contact point whereby supply of an armature current across a brush held in sliding contact with said commutator segments and a second brush held in sliding contact with said slip ring rotates a rotor at a constant rotational speed with respect to a stator having magnetized positive and negative poles.

FIELD OF THE INVENTION

This invention relates generally to a DC motor and, particularly, to an improvement in DC motor having incorporated therein a centrifugal governor, said motor being adapted for use with, for example, a portable electric gramophone.

There have heretofore been DC motors with centrifugal governors. One example of conventional DC motors of the kind mentioned has a Y-connection of three armature coils and utilizes a pair of sets of centrifugal governor contacts disposed at the connection. Another example of prior art DC motors of the kind has two slip rings provided coaxially with a rotor of the motor and having a single set of centrifugal governor contacts and a pair of brushes. These samples will be described in detail hereinafter. The motor of the first example has the drawbacks that the use of two sets of centrifugal governor contacts essentially necessitates an increased number of parts to be employed in the motor, which not only renders the structure complicated resulting in troublesome adjustment, but also increases the cost of manufacture. Also, the motor of the second example has the shortcomings that the motor requires two pairs of brushes when the brushes for the rotor are taken into account of, and further a pair of slip rings and, thus, the motor has an increased number of parts as the motor of the first example does, which results in complicated structure and troublesome adjustment.

SUMMARY OF THE INVENTION

A primary object of the present invention is to provide an improved and novel DC motor with governor which is free from such drawbacks of the conventional DC motor with governor, is of a low price and is simple in structure.

A further object of the present invention is to provide a DC motor which utilizes a single set of governor contacts and a pair of brushes and, thus, requires greatly simplified adjustment and shortened time therefor.

A still further object of the present invention is to provide a DC motor with governor which is easier to manufacture.

These and other objects and features of the present invention will be made apparent from the following description on the principle and an embodiment of the invention made with reference to the accompanying drawings.

FIGS. 1 and 2 are schematic views illustrating the principles utilized in examples of conventional DC motors, respectively, FIG. 3 is a schematic view illustrating the principle of an example of the DC motor according to the present invention, FIG. 4 is a side view of an embodiment of the DC motor of the present invention with parts being shown in section.

FIG. 5 is a cross sectional view taken along line V—V in FIG. 4 with a part being omitted for clarification purpose, and FIG. 6 is a front view of the centrifugal governor portion.

BRIEF DESCRIPTION OF PRIOR ART

Reference is first made to FIG. 1 which illustrates the principle of an example of conventional DC motor with governor. The motor shown in FIG. 1 has a magnetized stator 10 including a plus or N pole piece 11 and a minus or S pole piece 12. A rotor 16 is provided for rotation within the stator 10 and has thereon armature coils 13, 14 and 15 which are connected at one ends to commutator segments 17, 18 and 19, respectively. A pair of brushes 20 and 21 are provided in sliding contact with the commutator segments. The armature coils 13, 14 and 15 are connected one to the others at the other ends through two sets of centrifugal governor contacts 22 and 23 provided on the rotor 16.

In the DC motor of the above-described arrangement, the rotor 16 starts rotating in a predetermined direction when an armature current is supplied across the brushes 20 and 21. When the rotational velocity of the rotor 16 has reached a value in excess of a predetermined velocity, the centrifugal governor contacts 22 and 23 are opened to shut off the current supply to the armature coils 13, 14 and 15, so that the rotational velocity of the rotor is reduced to the predetermined velocity. A conventional DC motor of this type has the afore-mentioned drawbacks because of the fact that the motor is required to utilize two sets of centrifugal governor contacts.

There has been another type of DC motor in which such two sets of governor contacts are replaced by a single set of governor contacts, as shown in FIG. 2. In this type of motor, armature coils 13, 14 and 15 are connected at one ends to commutator segments 17, 18 and 19, respectively, and are directly connected together or to each other at the other ends. A set of centrifugal governor contacts 24 is provided between a brush 21 and a DC power source (not shown). The brush 21 and the DC power source are mounted on stationary or fixed parts and, further, the governor contacts 24 is mounted on a shaft 29 of a rotor 16. Therefore, two slip rings is required to connect the governor contacts 24 with the brush 21 and with the DC power source. For this purpose, there are provided slip rings 25 and 26 mounted on the shaft 29 of the rotor 16. Two brushes 27 and 28 are held in sliding contact with the slip rings 25 and 26, respectively. The parts in FIG. 2 identical with those in FIG. 1 respectively have been designated by the same numerals as in FIG. 1, the description on the identical parts being omitted. As such, it will be apparent that, in order to reduce two sets of governor contacts required by the conventional DC motor of the preceding example to a single one, the conventional DC motor of the instant example has been required to utilize a pair of additional slip rings and two additional brushes. For these reasons, the conventional DC motor of the type as shown in FIG. 2, while having a reduced number of governor contacts, has been complicated in structure, has required troublesome adjustments and, furthermore, has come extremely expensive.

DESCRIPTION OF PREFERRED EMBODIMENT

Now, a description will be made of a preferred embodiment of the DC motor of the present invention with reference to FIGS. 3 et al.

Referring first to FIG. 3 which diagrammatically illustrates the principle of the present invention, the motor of the invention has a magnetized stator 30 including a plus or N pole piece 31 and a minus or S pole piece 32. A rotor 36 is provided for rotation within the stator 30 and has thereon armature coils 33, 34 and 35 which are respectively connected at one ends to commutator segments 37, 38 and 39 circumferentially spaced a predetermined distance from one another. A first brush 40 is provided so as to be in sliding contact with the commutator segments. The motor employs a single centrifugal governor contact 41. The rotor 36 has its axle 42 on which is mounted a slip ring 43. A second brush 44 is provided so as to be in sliding contact with the slip ring 43. The other ends of the armature coils 33, 34 and 35 are directly connected together to form a connection point 45 which is connected to the slip ring 43 through the centrifugal governor contact 41. Specifically, a movable contact element 46 which is connected to the connection point 45 and a fixed or stationary contact 47 which is connected to the slip ring 43 constitute a set of governor contact 41.

When a DC power source is supplied across the first and the second brushes 40 and 44, a closed electrical circuit is formed by, in the position shown in FIG. 3, the plus (+) electrode terminal, the first brush 40, the commutator segment 39, the armature coil 35, the connection point 45, the governor contact 41, the slip ring 43, the second brush 44 and the minus (−) electrode terminal. Thus, the rotor 36 starts rotating in a predetermined direction within the stator 30 having its positive and negative magnetic poles by the current flowing through the armature coil 35. When the rotational velocity exceeds predetermined value, the movable contact 46 of the governor contact 41 is opened by the centrifugal force to have the armature coils 33, 34 and 35 opened with respect to the electrical power source for thereby shutting off the electrical supply to these armature coils, so that the rotational velocity of the rotor 35 is reduced to the predetermined velocity. When the rotational velocity of the rotor is lowered beyond the predetermined value, the governor contact 41 is closed again. This feature or operation is repeated to maintain the rotational velocity of the rotor 36 at constant.

An embodiment of such DC motor is shown in FIGS. 4 to 6 and will be described hereunder. Referring to FIGS. 4 and 5, the motor includes a motor casing 48 having an opening 49 at one end and a bearing portion 50 at the other end. A rim 51 is provided along the outer circumferential edge of the opening 49 while a bearing 52 is fitted into the bearing portion 50. A plurality of projections 53 is provided in and protrudes inwardly from the motor casing 48 at substantially intermediate portion thereof.

A circular stator 54 having magnetized positive and negative magnetic poles is inserted into the motor casing 48 and is supported in position by the ends of the projections 53. The circular stator 54, in the instant embodiment, is a bipolar magnet which is formed of a magnetic material, such as ferrite magnet, of higher coercive force Hc. Where a multipolar magnet is desired, a circular magnetic material may be magnetized so that there are produced different magnetic poles disposed alternately in circumferential direction.

The motor has a rotor whose rotational axle 55 of electrically conductive material is rotatably supported at a portion adjacent one end thereof by the bearing 52.

The axle 55 is mounted with a centrifugal governor 56 fastened thereto at a portion adjacent the bearing 52 by means of a screw 57. The centrifugal governor 56 will be described hereinafter in detail. Electrically insulating bushing 58 is fixed onto the rotational axle 55. Onto the outer peripheral surface of a base portion 59 of the bushing 58 is fixedly mounted a laminated iron core 60 of an appropriate configuration, for example, a radial shape. The iron core has pole pieces 64, 65 and 66 around which are respectively wounded armature coils 61, 62 and 63 electrically insulated from the pole pieces by appropriate insulating means.

The insulating bushing 58 has an extension 67 to which three arcuate commutator segments 68, 69 and 70 are fixedly applied with appropriate space left between each adjacent pairs of the segments. The commutator segments 68, 69 and 70 respectively have at their one ends bent or turned terminals 71, 72 and 73 fixedly attached to the base portion 59 of the insulating bushing 58. The fixed attachment of the terminals may be by way of conventional means, such as, molding.

A slip ring 74 is mounted on the rotational axle 55 at the other end thereof. Further, a bracket 75 having a bearing portion 76 disposed centrally thereof is fastened onto the rim 51 of the motor casing 48 by means of screws 79. First and second brushes 77 and 78 both in the form of thin leaf springs are secured to the bracket 75 by appropriate fastening means in such a manner as will be described later. The bearing portion 76 receives therein a bearing 80 by means of which the other end of the rotational axle 55 is rotatably supported.

The first brush 77 is held at one end in sliding contact with the outer peripheral surface of the commutator segments and is supported at the other end from the bracket 75 by means of fastening means such as rivets 83 with electrical insulating plates 81 and 82 on the opposite surfaces of the bracket. To the first brush 77 at an appropriate location thereon (preferably, at such a location as to be able to keep, at as lower resonance point as possible, the vibration of the brush during rotation of the commutator segments) is applied or attached, by appropriate means, a soft and resilient material 84, such as a soft rubber, which is effective to minimize the generation of excessive vibration in the brush for thereby improving the rectificating operation, to prevent production of electrical and mechanical noises and further to weaken the pressure-contact by the forward end of the brush against the surfaces of the commutator segments. A lead wire 85 is connected at one end to the first brush 77 and to an electrical power source at the other extension end of the wire.

The second brush 78 is held at one end in sliding contact with the outer peripheral surface of the slip ring 74 and is supported at the other end from the bracket 75 by means of fasteners such as rivets 88 with electrical insulating plates disposed on the opposite surfaces of the bracket. The second brush also has a soft resilient material 89, such as a soft rubber, attached thereto by appropriate means such as an adhesion. The resilient material 89 provides advantages completely identical with those obtainable from the above-mentioned soft resilient material 84. The second brush is connected with one end of another lead wire 90 which in turn is connected at the other extended end to the electrical power source.

Then, a description will be made of the centrifugal governor 56 in conjunction with FIG. 6. The governor 56 comprises an electrically conductive governor base 91 on which the centrifugal governor contact is mounted. Specifically, an electrically conductive screw 92 is threadably and adjustably mounted on a portion of the governor base 91 and has an electrical contact 93 attached to the top of the screw. A resilient movable contact element 94 having attached thereto at one end an electrical contact 95 is mounted in electrically insulated state on the governor base 91 at a portion thereof by means of a mounting screw 97 with an electrically insulating plate 96 being interposed between the governor base 91 and the contact element 94. The movable contact element 94 has a weight 98 for centrifugal force mounted thereon at substantially intermediate portion thereof. The governor base 91 is provided at a portion thereof with a stopper 99 for restricting or limiting centrifugally actuated opening movement of the movable contact element 94 within a predetermined range.

The armature coil 61 wound around the first pole piece 64 of the laminated iron core 60 has its one end connected to the bent terminal 73 of the commutator segment 70. The armature coil 62 wound around the second pole piece 65 has its one end connected to the bent terminal 71 of the commutator segment 68. Further, the armature coil 63 wound around the third pole piece 66 has its one end connected to the bent terminal 72 of the commutator segment 69. These armature coils 61, 62 and 63 have their other ends gathered into one which is connected to the other end of the movable contact element 94.

In the motor of the above-described arrangement, when a DC power source is provided with its positive electrode connected to the lead wire 85 and with a negative electrode connected to the lead wire 90 to supply armature current to the armature coils, there is formed a closed electrical circuit by the lead wire 85, the first brush 77, the commutator segments 68, 69 and 70, the armature coils 61, 62 and 63, the movable contact element 94, the electrical contact 95, the electrical contact 93, the mounting screw 92, the electrically conductive governor base 91, the rotational axle 55, the slip ring 74, the second brush 78 and the lead wire 90. Thus, the rotor which is formed by the laminated iron core 60, the armature coils 61, 62 and 63 etc. rotates within the circular stator 54 by virtue of the rotational axle 55 and, when the rotational velocity of the rotor exceeds a predetermined value, the movable contact element 94 is opened by the centrifugal force of the weight 98 to render the electrical contacts 95 and 93 opened from one another for thereby opening and shutting off the electrical supply to the armature coils 61, 62 and 63, so that the rotational velocity of the rotor resumes its initial predetermined velocity of rotation. Thus, the rotor become rotating again at the predetermined velocity and such operation is repeated to always maintain the rotor velocity constant.

As has been described in the above, the present invention provides a DC motor with centrifugal governor which not only affords satisfactory operation and capacity, but also is advantageous over the conventional DC motor shown in FIG. 1 in that the motor of the present invention requires only a single set of governor contacts and this serves to save the cost for materials as well as to greatly shorten the time required for the adjustment. As compared also with the prior art DC motor shown in FIG. 2, the motor of the present invention provides advantages that the motor saves a single slip ring and two brushes as employed by the prior art DC motor. Thus, it will be apparent that the present invention provides a DC motor which is more economical and is simpler in construction as compared with both of the conventional motors shown in FIGS. 1 and 2.

Incidentally, though FIG. 4 shows an example wherein the slip ring 74 is disposed outwardly of the motor casing, it will be apparent to those skilled in the art that the slip ring may be positioned inwardly of the motor casing.

Furthermore, the aforedescribed embodiment includes a feature that the slip ring is mounted on the rotational axle of the rotor and a single brush is held in contact with the peripheral surface of the slip ring. However, the brush may be supported directly in sliding contact with the rotational axle without utilizing the slip ring.

Though the present invention has been illustrated and described with reference to a paritcular embodiment, it is to be understood that the invention is not restricted to the particular embodiment and may have various changes and modifications within the spirit of the invention.

What is claimed is:

1. A DC motor comprising a stator having magnetized positive and negative poles; a rotor adapted to be rotated with respect to said stator and including an axle for rotation, an iron core secured to said axle with an electrically insulating material interposed therebetween and having a plurality of pole pieces, three or more armature coils each wound around each of said pole pieces and a plurality of commutator segments disposed on said axle with an electrically insulating material interposed therebetween, said segments being spaced a predetermined distance from one another and each connected to one end of each armature coil; a centrifugal governor having only one set of governor contacts mounted on said axle for rotation therewith; a single slip ring mounted on said axle; a first brush supported so as to be in sliding contact with the outer peripheral surfaces of said commutator segments and adapted to be connected to one electrode of a DC power source; and a second brush supported so as to be in sliding contact with the outer peripheral surface of said slip ring and adapted to be connected to the other electrode of said DC power source; said three or more armature coils being electrically directly connected together at the other ends and connected to said slip ring through said set of governor contacts; and said all armature coils being simultaneously opened from or closed to said power source by said single set of governor contacts.

2. A DC motor as claimed in claim 1 in which said axle for rotation is composed of electrically conductive material, and said centrifugal governor includes an electrically conductive governor base mounted on said axle, a first electrical contact disposed at a portion in said governor base, a movable contact element in the form of a thin leaf spring having a second electrical contact mounted thereon at one end and disposed in opposed relation to said first electrical contact so as to be brought into contacting engagement with an disengagement from said first electrical contact, said movable contact element having its other end fixed onto a part of said governor base with an electrically insulating material interposed therebetween the other end of said movable contact element being connected to the other ends of said armature coils directly connected together, and a weight for centrifugal force mounted on said movable contact element.

3. A DC motor as claimed in claim 1 in which each of said first and second brushes has a soft resilient material mounted thereon at a predetermined location so as to afford said brushes to have improved sliding contact operations.

4. A DC motor comprising a stator having magnetized positive and negative poles; a rotor rotatable within said stator and including a rotational axle of electrically conductive material, a laminated iron core fixed to said axle with an electrically insulating material interposed therebetween, said iron core having a plurality of pole pieces, three or more armature coils wound around said pole pieces respectively, and a plurality of commutator segments disposed on said rotational axle with an electrically insulating material interposed therebetween, said commutator segments being spaced a predetermined distance from one another and connected to one ends of said armature coils respectively; a centrifugal governor mounted on said rotational axle and including an electrically conductive governor base fixed onto said rotational axle, a first electrical contact disposed at a part of said governor base, a movable contact element in the form of a thin leaf spring having a second electrical contact mounted on one end thereof and disposed in opposed relation to said first electrical contact so as to be brought into contacting engagement with and disengagement from said first electrical contact, said movable contact element having its other end fixed onto a part of said governor base with an electrically insulating material interposed therebetween, the other end of said movable contact element being connected to all the other ends of said armature coils electrically, a weight for centrifugal force mounted on said movable contact element, and a stopper for limiting a movable range of said movable contact element mounted on said governor base; a single slip ring mounted on said rotational axle and electrically connected to said governor base through said rotational axle; a first brush supported so as to be in sliding contact with the outer peripheral surfaces of said commutator segments and adapted to be connected to one electrode of a DC power source; and a second brush supported so as to be in sliding contact with the outer peripheral surface of said slip ring and adapted to be connected to the other electrode of said DC power source.

5. A DC motor as claimed in claim 4 in which each of said first and second brushes has a soft resilient material mounted thereon at a predetermined location to afford said brushes to have improved sliding contact operations.

6. A DC motor comprising a motor casing having at one end a bearing portion disposed centrally thereof for snugly receiving a bearing and having at the other end an opening provided with a rim extending along the outer circumferential edge of said opening; a bracket secured at its outer marginal portion to said motor casing rim and provided with a bearing portion centrally thereof for snugly receiving a second bearing; a stator supported within said motor casing and having mangetized positive and negative poles; a rotational axle of electrically conductive material rotatably supported by said bearings; a rotor rotatable within said stator and including a laminated iron core fixed to said rotational axle with an electrically insulating material interposed therebetween, said iron core having a plurality of pole pieces, three or more armature coils wound around said pole pieces respectively, and a plurality of commutator segments disposed on said rotational axle with an electrically insulating material interposed therebetween, said commutator segments being spaced a predetermined distance from one another and connected to one ends of said armature coils respectively; a centrifugal governor including an electrically conductive governor base fixed onto said rotational axle, a first electrical contact disposed at a part of said governor base, a movable contact element in the form of a thin leaf spring having a second electrical contact mounted on one end thereof and disposed in opposed relation to said first electrical contact so as to be brought into contacting engagement with and disengagement from said first electrical contact, said movable contact element having its other end fixed onto a part of said governor base with an electrically insulating material interposed therebetween, all the other ends of said armature coils being electrically connected to the other end of said movable contact element, a weight for centrifugal force mounted on said movable contact element and a stopper for limiting a movable range of said movable contact element mounted on said governor base; a single slip ring mounted on said rotational axle and electrically connected to said first electrical contact of said centrifugal governor through said rotational axle; a first brush having its one end in sliding contact with the outer peripheral surfaces of said commutator segments and having the other end secured to said bracket with an electrically insulating material interposed therebetween, said brush further having a soft resilient material mounted thereon at a predetermined location to afford said brush to have an improved sliding contact operation; and a second brush having its one end in sliding contact with the outer peripheral surface of said slip ring and having the other end secured to said bracket with an electrically insulating material interposed therebetween, said second brush further having a soft resilient material mounted thereon at a predetermined location to afford said second brush to have an improved sliding contact operation.

7. A DC motor as claimed in claim 6 in which, when said rotor is rotated at a predetermined rotational velocity or less, a closed electrical circuit is formed by one of the electrodes of a DC power source, said first brush, said commutator segments, said armature coils, said centrifugal governor, said rotational axle, said slip ring, said second brush and the other electrode of said DC power source in the order as mentioned, whereas said centrifugal governor is actuated to open said closed circuit when the rotational velocity of said rotor exceeds the predetermined value.

References Cited

UNITED STATES PATENTS

| | | | |
|---|---|---|---|
| 2,478,848 | 8/1949 | Sullivan | 310—68.5 |
| 2,738,391 | 3/1956 | Tesh | 310—68.5 |
| 2,761,031 | 8/1956 | McDonald | 310—68.5 |
| 2,833,879 | 5/1958 | Naul | 310—68.5 |
| 2,814,770 | 11/1957 | Tourtellot | 310—68.5 |
| 3,058,045 | 10/1962 | Feinot | 310—68.5 |
| 3,062,091 | 11/1962 | Akahane | 310—50 |
| 3,121,811 | 2/1964 | Marti | 310—67 |
| 3,206,667 | 9/1965 | Haase | 310—68 |
| 3,020,465 | 2/1962 | Rowe | 310—68 |

MILTON O. HIRSHFIELD, Primary Examiner

R. SKUDY, Assistant Examiner

U.S. Cl. X.R.

318—325